(12) United States Patent
Chike

(10) Patent No.: US 11,305,394 B2
(45) Date of Patent: Apr. 19, 2022

(54) BLADE GUARD FOR SAW OF SAW HOUSE AND METHOD

(71) Applicant: Paper Converting Machine Company, Green Bay, WI (US)

(72) Inventor: Matthew J. Chike, Luxemburg, WI (US)

(73) Assignee: Paper Converting Machine Company, Green Bay, WI (US)

( * ) Notice: Subject to any disclaimer, the term of this patent is extended or adjusted under 35 U.S.C. 154(b) by 114 days.

(21) Appl. No.: 16/395,369

(22) Filed: Apr. 26, 2019

(65) Prior Publication Data

US 2020/0338676 A1   Oct. 29, 2020

(51) Int. Cl.
| | | |
|---|---|---|
| *B23Q 11/08* | (2006.01) | |
| *B23Q 11/00* | (2006.01) | |
| *B23D 45/04* | (2006.01) | |
| *B26D 1/15* | (2006.01) | |
| *B26D 7/22* | (2006.01) | |

(52) U.S. Cl.
CPC .......... *B23Q 11/08* (2013.01); *B23Q 11/0078* (2013.01); *B23D 45/042* (2013.01); *B26D 1/15* (2013.01); *B26D 7/22* (2013.01)

(58) Field of Classification Search
CPC ........ B27G 19/00; B27G 19/02; B27G 19/04; B27G 21/00; Y10T 83/7734; Y10T 83/773; Y10T 83/96; B23D 45/06–068; B23D 47/025; B23D 45/04; B23D 45/042; B23D 45/046; B23Q 11/08; B23Q 11/0816; B23Q 11/0078; B23Q 11/0085; B23Q 11/0089; Y10S 83/01; B26D 1/01; B26D 1/12; B26D 1/14; B26D 1/141; B26D 1/143; B26D 1/147; B26D 1/15; B26D 1/151; B26D 1/153; B26D 1/157; B26D 1/16; B26D 1/18; B26D 1/28; B26D 1/29; B26D 7/22; B26D 7/225; B26D 7/24; B26D 2210/11
USPC .......................... 83/478, 477.2, 859, DIG. 1; 144/251.1–251.3
See application file for complete search history.

(56) References Cited

U.S. PATENT DOCUMENTS

| | | | |
|---|---|---|---|
| 344,292 | A | 6/1886 | Touchette |
| 1,794,758 | A | 3/1931 | Dittmar |
| 2,183,675 | A | 12/1939 | Griebling |

(Continued)

FOREIGN PATENT DOCUMENTS

| | | | | |
|---|---|---|---|---|
| CN | 108621253 | * | 10/2018 | ........... A01G 23/006 |
| DE | 103 61 297 B3 | * | 1/2005 | ............. B27G 19/02 |

(Continued)

OTHER PUBLICATIONS

International Search Report and Written Opinion for PCT/US2019/029342 dated Jun. 28, 2019.

*Primary Examiner* — Evan H MacFarlane
(74) *Attorney, Agent, or Firm* — Thompson Coburn LLP

(57) ABSTRACT

A blade guard assembly for a circular saw blade of a saw house includes a blade cover with a face panel and an edge portion that extends from the face panel. An actuator is mountable the blade cover and the structure of the saw house. When the blade guard assembly is mounted in saw house, the blade cover is movable with the actuator between a covered position and an exposed position. In the covered position, the face panel and edge portion at least partially surround the saw blade. In the exposed position, the face panel is spaced from the saw blade.

9 Claims, 14 Drawing Sheets

(56) References Cited

U.S. PATENT DOCUMENTS

| | | | |
|---|---|---|---|
| 3,213,731 A | 10/1965 | Renard | |
| 4,294,148 A | 10/1981 | Drixler | |
| 4,365,446 A | 12/1982 | Munekata et al. | |
| 4,516,612 A * | 5/1985 | Wiley | B23D 45/062 |
| | | | 144/1.1 |
| 5,531,147 A | 7/1996 | Serban | |
| 6,405,624 B2 | 6/2002 | Sutton | |
| 6,591,725 B1 * | 7/2003 | Martin | B23D 45/062 |
| | | | 83/471.3 |
| 7,540,223 B2 * | 6/2009 | Sasaki | B27G 19/02 |
| | | | 83/102.1 |
| 7,707,920 B2 * | 5/2010 | Gass | B23D 59/001 |
| | | | 83/781 |
| 8,091,457 B2 | 1/2012 | Li | |
| 8,127,648 B2 * | 3/2012 | Arvey | B27G 19/02 |
| | | | 83/102.1 |
| 8,205,533 B2 * | 6/2012 | Tanaka | B27G 19/08 |
| | | | 83/478 |
| 8,522,658 B2 * | 9/2013 | Frolov | B27G 19/02 |
| | | | 83/473 |
| 8,844,415 B2 * | 9/2014 | Taylor | B23D 59/006 |
| | | | 83/99 |
| 9,975,269 B2 * | 5/2018 | Koegel | B27G 19/02 |
| 10,076,796 B2 * | 9/2018 | Chung | B23D 59/006 |
| 2002/0056350 A1 | 5/2002 | Gass et al. | |
| 2009/0088059 A1 | 4/2009 | Denis et al. | |
| 2012/0036976 A1 * | 2/2012 | Frolov | B27G 19/02 |
| | | | 83/473 |
| 2012/0103156 A1 | 5/2012 | Li | |
| 2017/0252841 A1 * | 9/2017 | Wang | B23D 59/006 |
| 2019/0070744 A1 | 3/2019 | Chike et al. | |
| 2020/0171615 A1 | 6/2020 | Chiocchetti et al. | |

FOREIGN PATENT DOCUMENTS

| | | | |
|---|---|---|---|
| EP | 3479975 A1 | 5/2019 | |
| GB | 641772 | * 8/1950 | B23Q 11/08 |

* cited by examiner

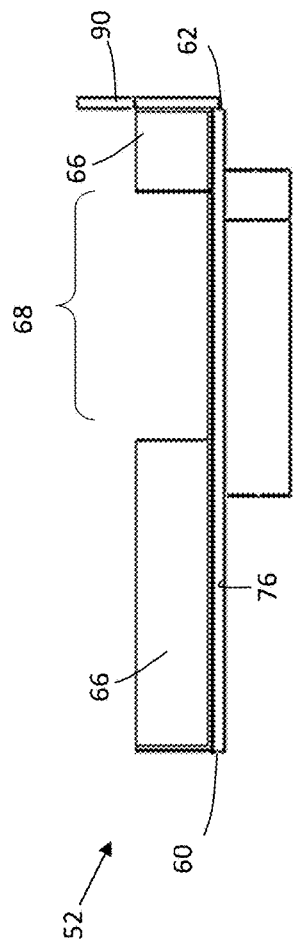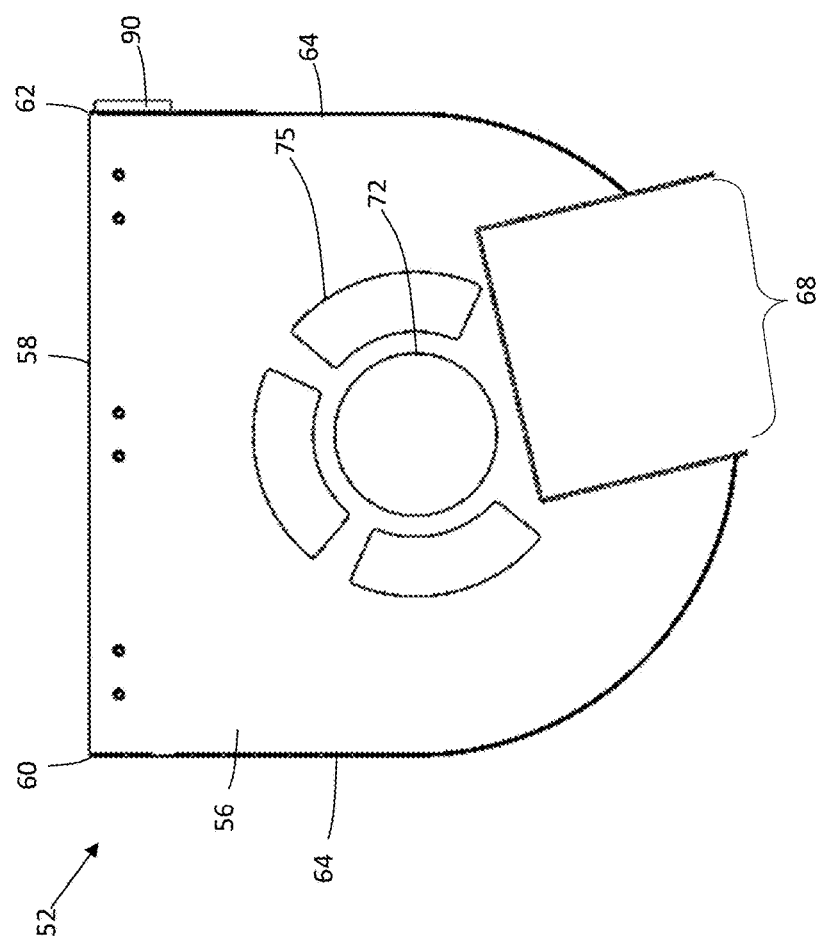

BLADE GUARD FOR SAW OF SAW HOUSE AND METHOD

BACKGROUND AND SUMMARY

The present disclosure relates to a blade guard assembly for a circular saw blade of a saw house. More in particular, the disclosure relates to a blade guard assembly for one or more orbital saw blades of a saw house. The blade guard assembly includes a blade cover for each saw blade and an actuator for positioning the blade cover(s) in a manner to surround and cover at least a portion of the respective saw blade and its cutting edge.

As will be described in greater detail below, the saw house includes panels and access opening(s) that enclose a cutting area within an interior of the saw house. There may also be guards and gates in an area adjacent to the saw house. The saw house may also include windows to allow viewing of the saw blade and other critical functions. The saw house access openings and adjacent area gates and guards may be provided with locks, switches, and other sensors that control access through the access openings and/or gates.

When an operator desires access to an interior of the saw house or an adjacent cutting area, the operator may operate a control associated with the saw house via a human machine interface (HMI) to disable the saw blade and suspend normal cutting operations. An arm associated with the saw blade may then position the saw blade(s) in a known position, for instance, a stopping position, or a home position or maintenance position, within an interior of the saw house. Once the saw blade(s) are positioned in the known position, the blade guard assembly may position a blade cover over the saw blade(s). The blade cover may cover over at least a portion of the respective saw blade so that at least a part of the cutting edge, for instance, that portion of the cutting edge of the saw blade most likely to be contacted in the saw house interior, is not exposed in the interior of the saw house. More preferably, a majority of the cutting edge of the saw blade is not exposed. Even more preferably, a substantial part, or even more preferably, almost an entirety of the cutting edge of the saw blade is not exposed.

Once the blade cover is positioned over the respective saw blade, the blade cover may interface with a control associated with the saw house. The control may send signals to disable locks to the access openings of the saw house and/or adjacent gates and guards to allow an operator to enter a cutting area adjacent to the saw house and/or an interior of the saw house.

Once access is complete and the access opening and/or gates and guards are closed, the operator may operate the control to lock the access openings and/or gates and guards.

The control may actuate the actuator on the blade guard assembly to move the blade cover(s) to the exposed position to allow normal cutting operations of the saw blade(s) and arm to resume.

When maintenance to the saw blade is required, the blade guard assembly may be disabled by the control associated with the saw house prior to the operator accessing the cutting area and/or interior of the saw house. A dedicated maintenance blade carrier for the saw blade may be provided for the operator to complete any needed blade maintenance activities, including removal, transportation, inspection, and/or installation of the saw blade. The maintenance blade carrier may be provided with an interlock and electronic sensors such that when the maintenance blade carrier is being used, the saw blade and the saw blade arm are disabled from normal cutting operations. The maintenance blade carrier may cooperate with the same sensors as the blade guard assembly or other sensors in the saw house to provide signals to the control that the maintenance blade carrier is installed over the saw. Sensors in the saw house may also provide signals to the control that the maintenance blade carrier and saw blade have been removed from the saw arm. Once the maintenance blade carrier is returned to its dedicated storage position, the blade cover may be returned either automatically or manually to a position covering the saw blade. Normal cutting operations may resume only after the maintenance blade carrier is located in its dedicated storage position, and the access to the saw house and/or adjacent cutting areas have been closed and locked. In the alternative, a portion of the blade guard assembly, for instance, the blade cover, may be used as the maintenance blade carrier and interface with the control of the saw house in the aforementioned manner.

The blade guard assembly and interface with the saw house control allows access to the interior of the saw house and/or adjacent cutting areas without special protective equipment. Further, the blade cover may be provided with a cut out to allow access to the grinding wheels associated with the circular saw blade of the saw house. Thus, an operator may perform maintenance on the grinding wheel assembly with the blade cover in place covering over the cutting edge of the saw blade. As will become evident from the description that follows below, an automatic system with interlocks is presented to provide a safe environment for an operator to access the interior of the saw house and/or the adjacent cutting areas.

BRIEF DESCRIPTION OF THE DRAWINGS

FIG. 10 is a rear view of the blade cover of FIG. 8.

FIG. 11 is a top view of the blade cover of FIG. 8 (a view opposite the view of FIG. 8).

DETAILED DESCRIPTION

Figure 1:
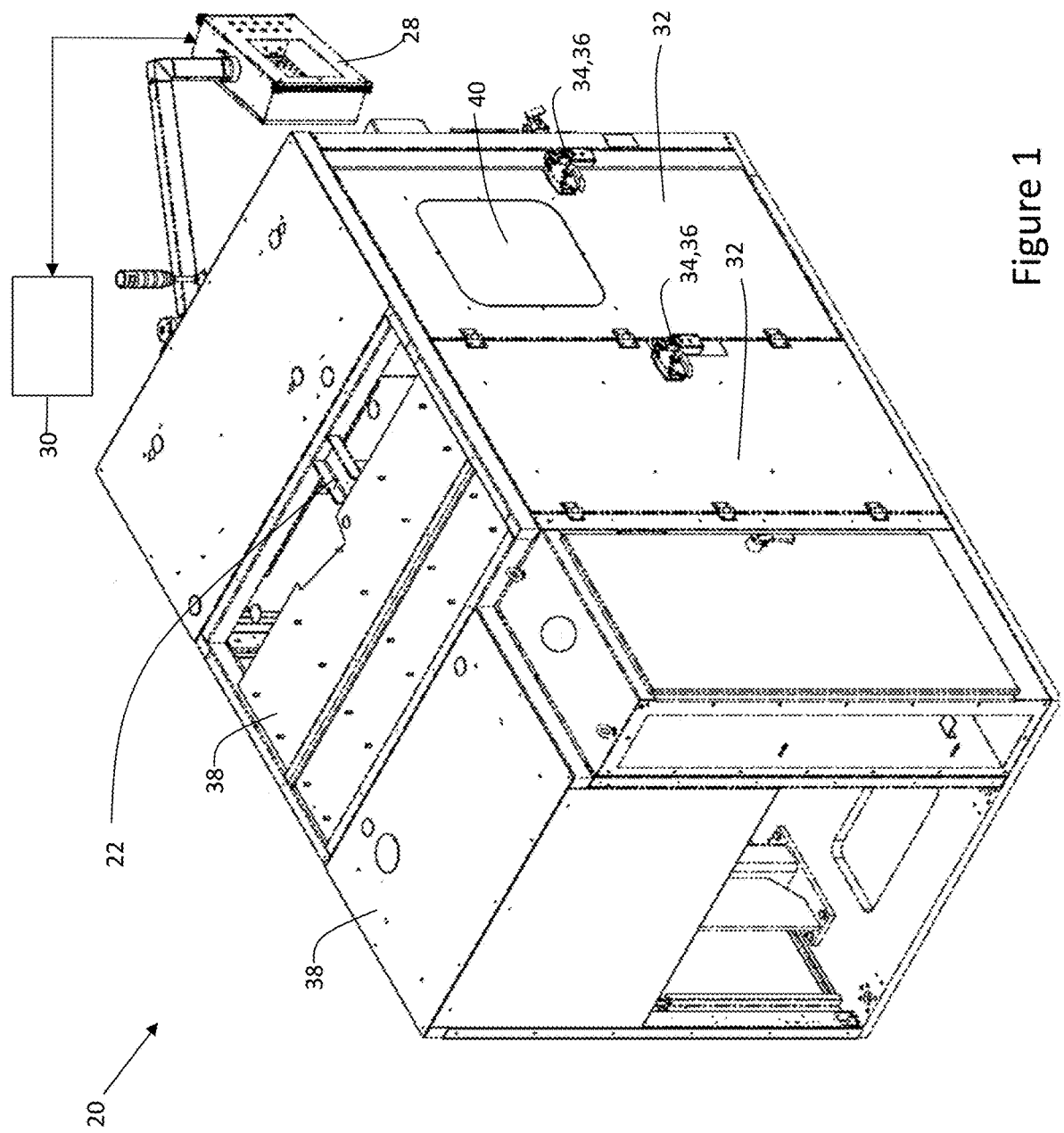
FIG. 1 is a perspective view of an exemplary saw house.
Figure 2:
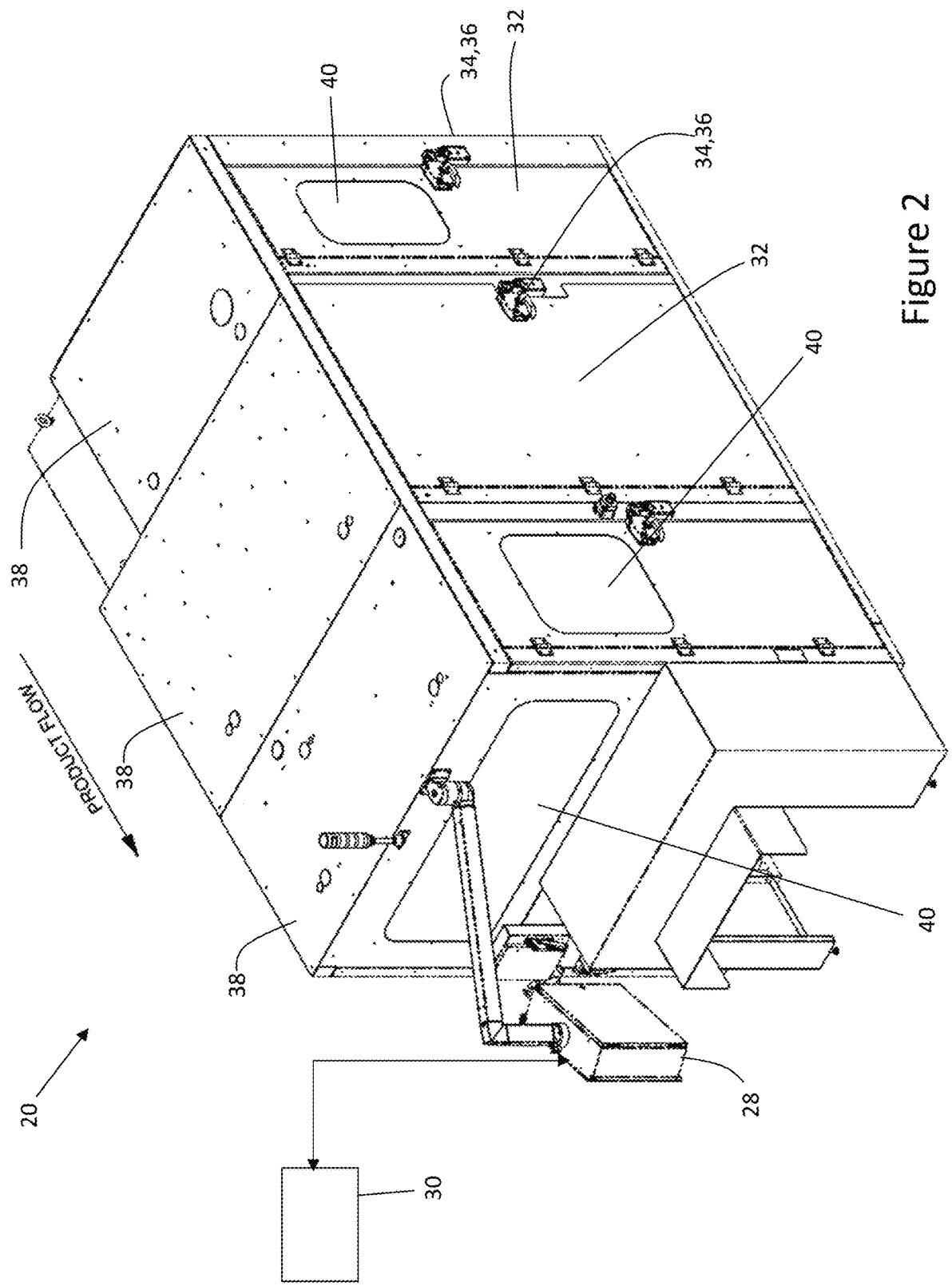
FIG. 2 is another perspective view of an exemplary saw house.
Figure 3:
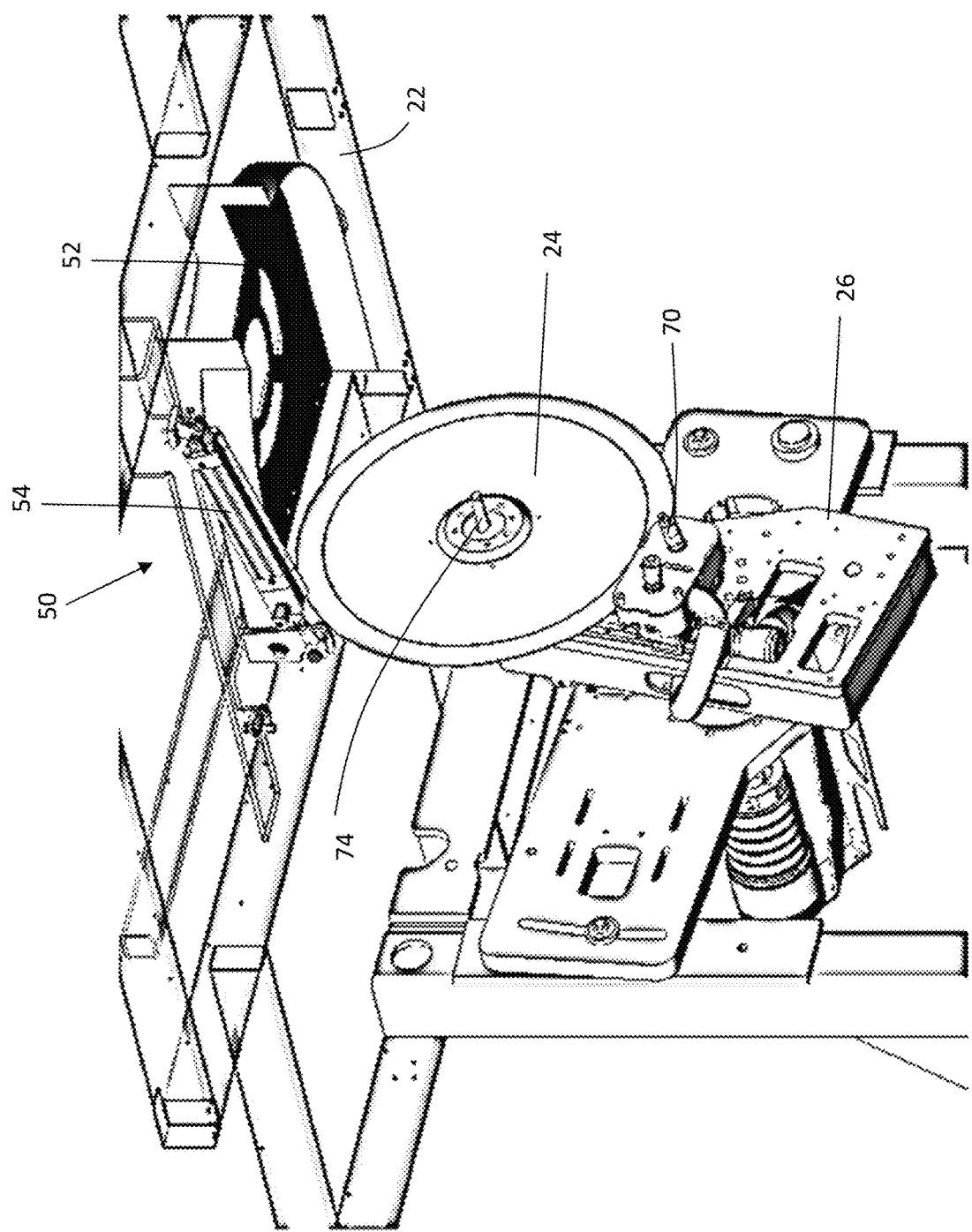
FIG. 3 is a partial, perspective view of a saw arm with a saw blade in a home position with a blade guard assembly mounted to a frame of the saw house and a blade cover of the blade guard assembly in an exposed position.
Figure 4:
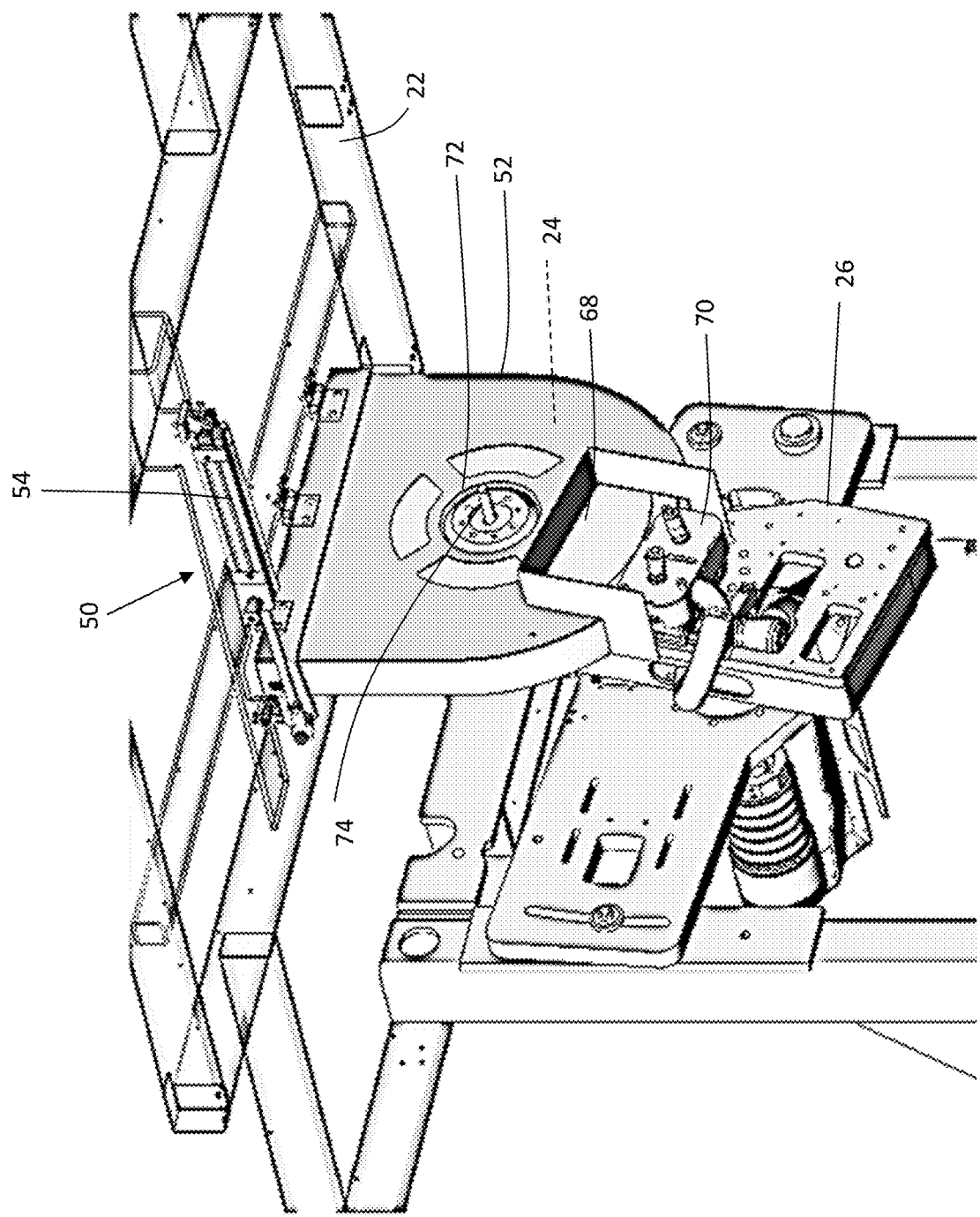
FIG. 4 is a partial perspective view of the saw arm with the saw blade in the home position with the blade cover of the blade guard assembly in a covered position over the saw blade.
Figure 5:
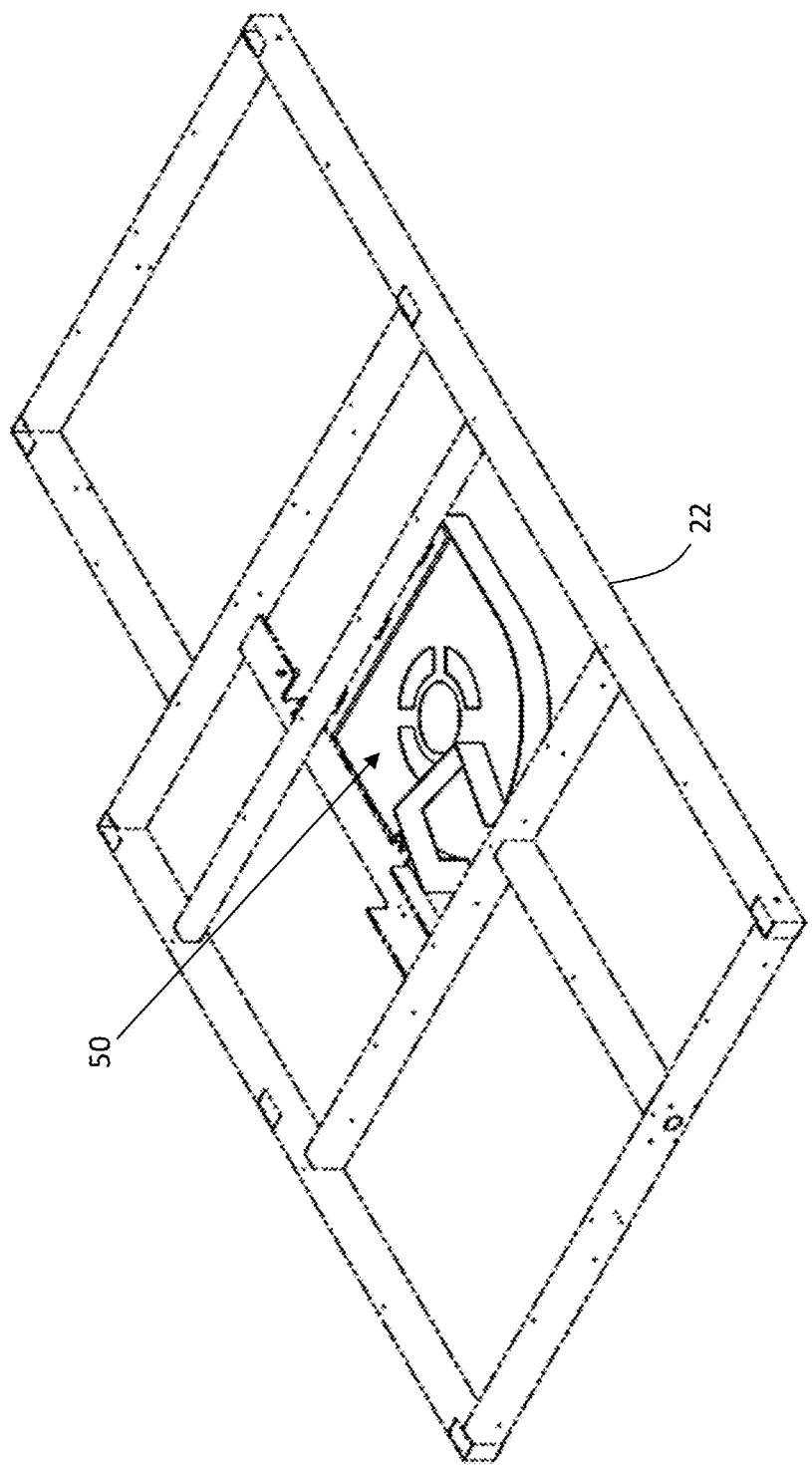
FIG. 5 is a partial perspective view of a top frame of the saw house of FIG. 2 showing the general location of the blade guard assembly when mounted to the frame of the saw house.
Figure 6:
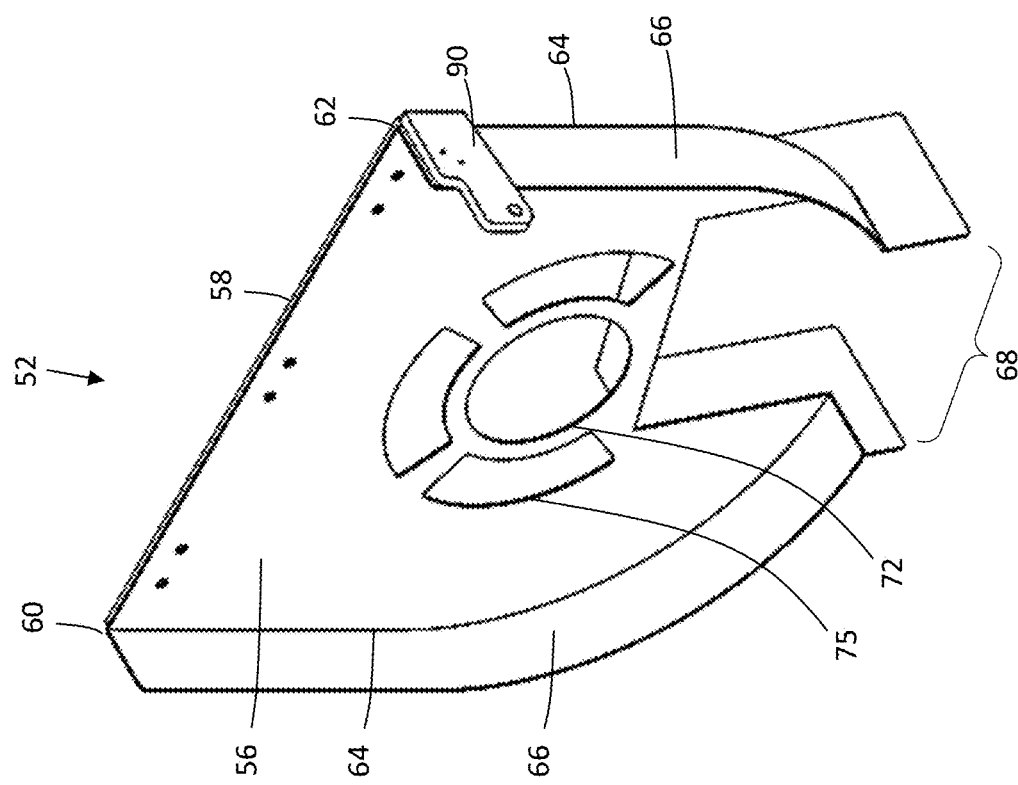
FIG. 6 is a perspective view of the blade cover of the blade guard assembly.
Figure 7:
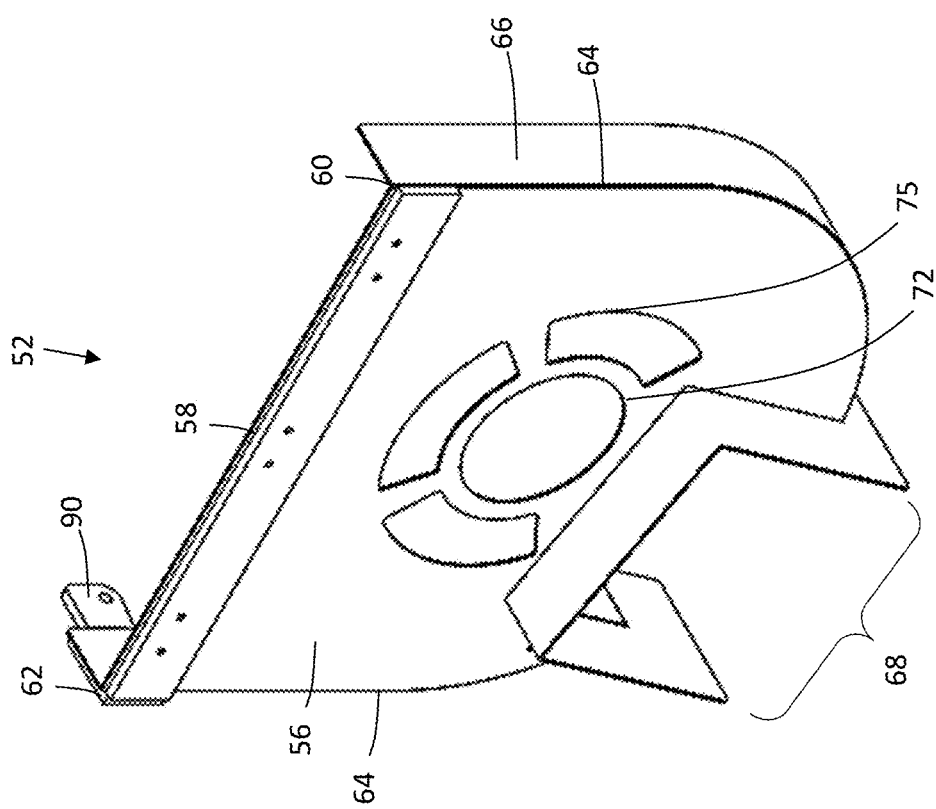
FIG. 7 is another perspective view of the blade cover of the blade guard assembly.
Figure 9:
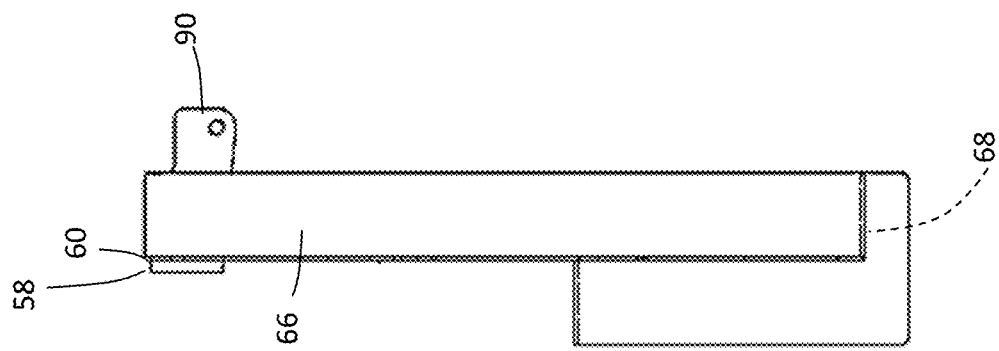
FIG. 9 is a right side view of the blade cover of FIG. 8.
Figure 8:
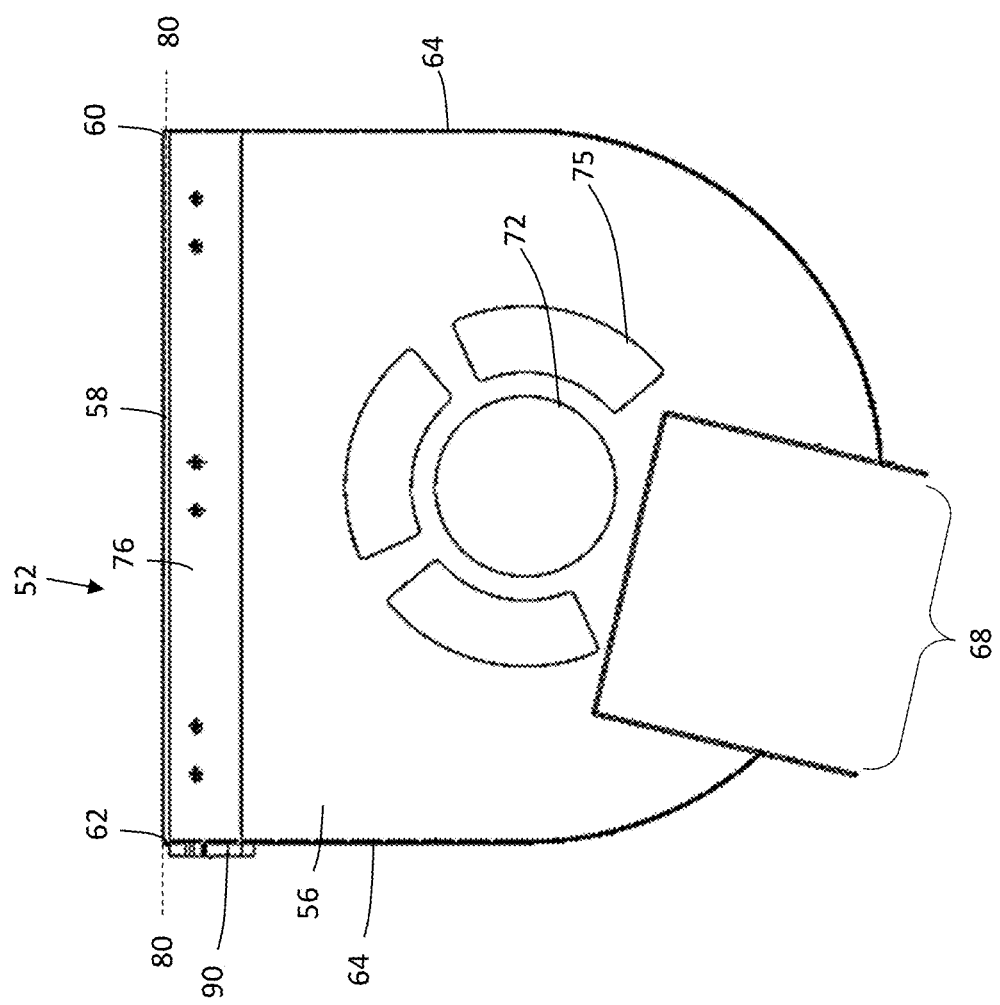
FIG. 8 is a front view of the blade cover of FIG. 7.
Figure 12:
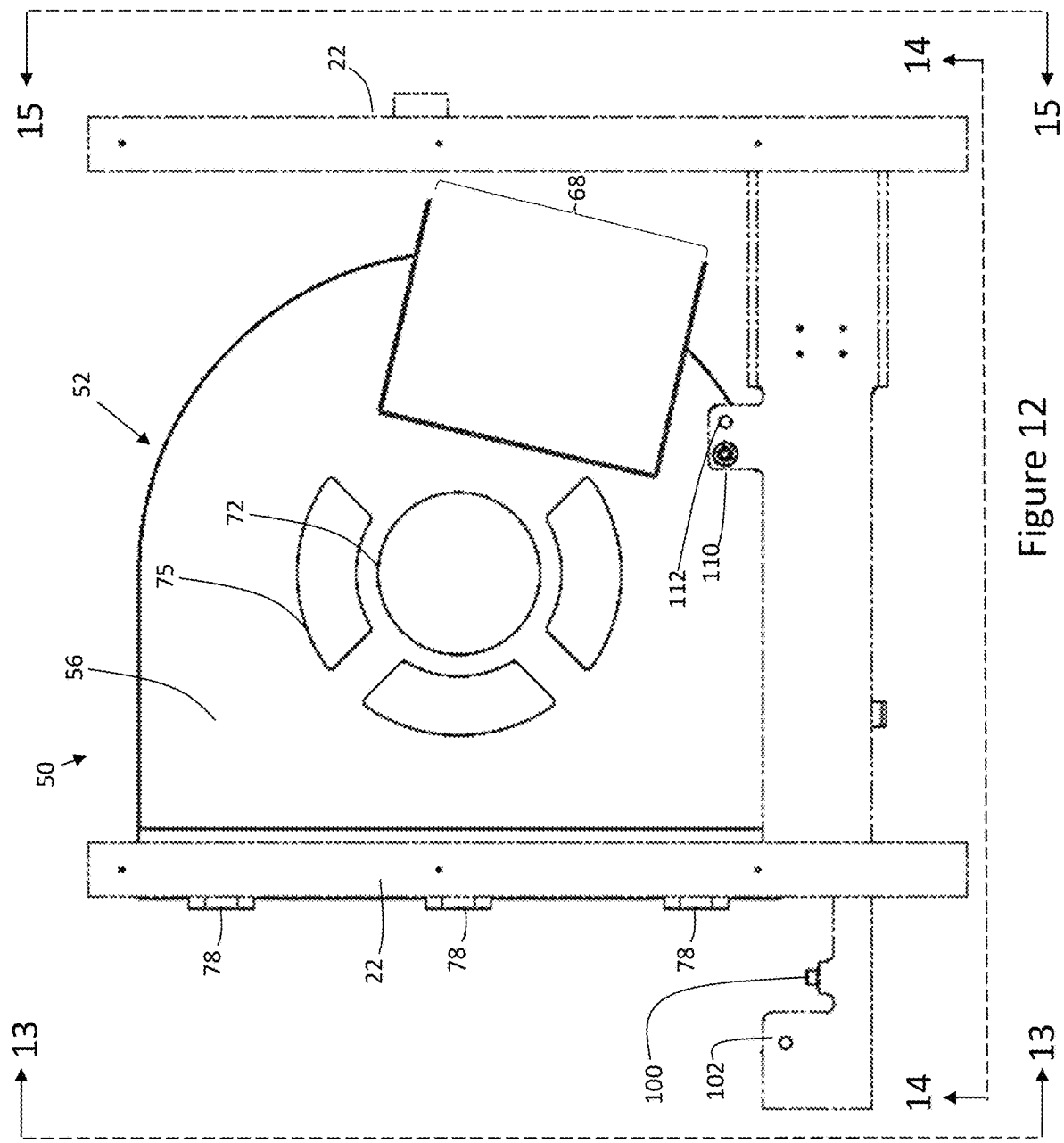
FIG. 12 is a top view of the blade guard assembly mounted to the frame of the saw house.
Figure 13:
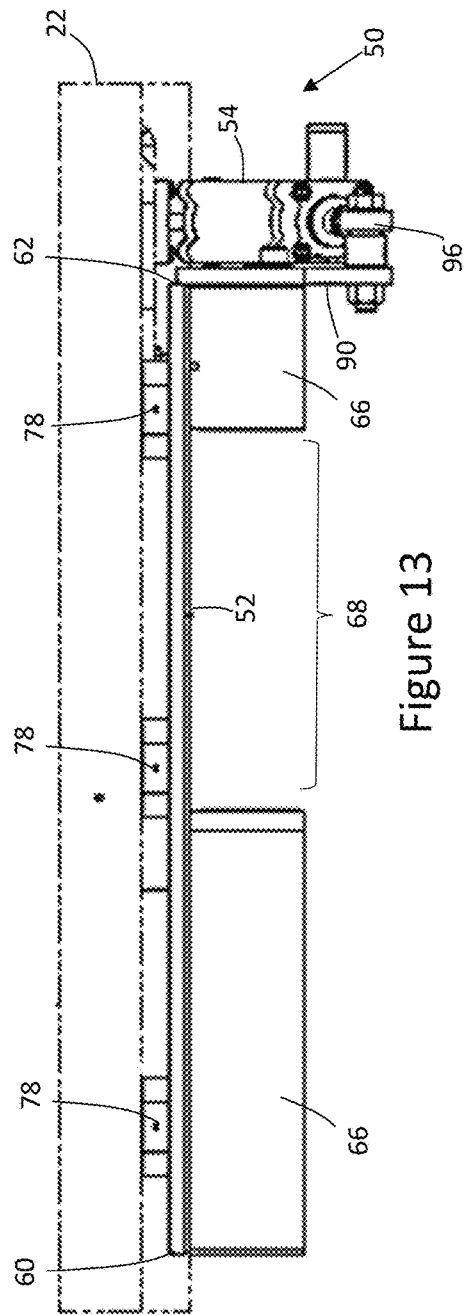
FIG. 13 is a partial, cross-sectional view of the blade guard assembly taken along lines 13-13 of FIG. 12.
Figure 17:
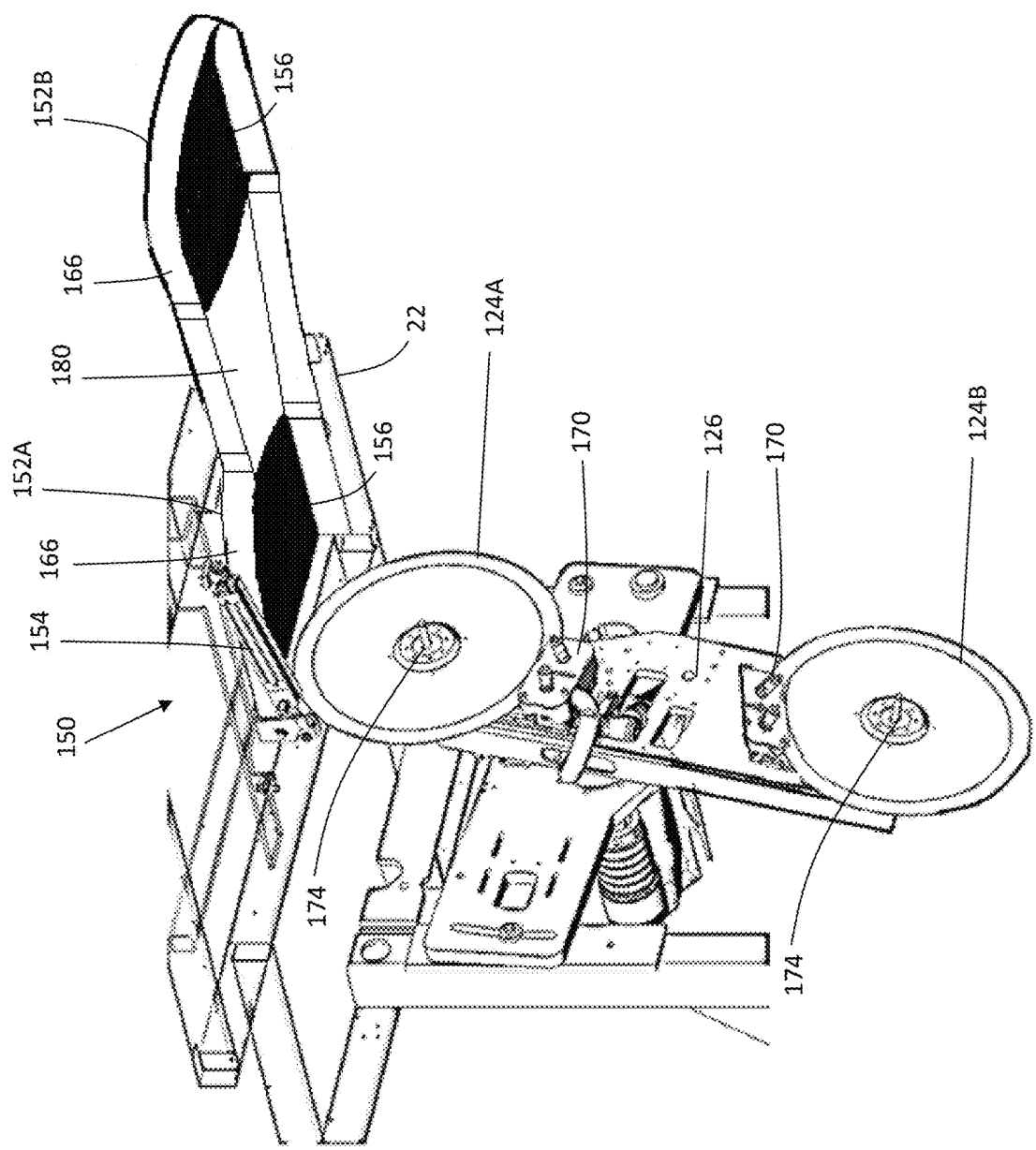
FIG. 17 is a partial, perspective view of a saw arm with two saw blades in a home position with a blade guard assembly mounted to a frame of the saw house and blade covers for the respective saw blades in an exposed position.

FIGS. 1 and 2 show an exemplary saw house 20. The saw house 20 comprises a rectangular structure with a support frame 22. Typically, the material to be cut in the saw house, for instance, logs of convolutely wound web material, are passed through the saw house 20 on a conveyor (not shown) with a saw blade 24 cutting the logs into rolls for consumer end use as the logs pass through the conveyor in the saw house. As shown in FIGS. 3 and 4, the saw house 20 may include an orbital circular saw blade 24 disposed on an arm 26 within the saw house interior. There may be one saw blade 24 on the arm 26, for instance, as shown in FIG. 3, or multiple saw blades on the arm, for instance, as shown in FIG. 17. Multiple conveyor lanes may also be directed through the saw house to cut the logs as the logs are advanced to the saw blade through the saw house. The saw house 20 may have a human machine interface with a display (HMI) 28 to allow an operator to control operation of the saw house 20, arm 26, and blade 24. The HMI 28 may interface with a control 30 associated with the saw house and/or conveyor. The control 30 may be integral with the saw house HMI 28 or connected electronically via a wired or wireless network. The saw house 20 may include access openings 32, for instance, doors and panels to allow an operator to enter the saw house interior. The access openings 32 may have locks 34 and sensors 36 indicating when the access opening 32 is closed and locked, or open and unlocked. The panels 38 of the saw house 20 may also have sensors which transmit signals to the control 30 indicating whether the panels are installed. The saw house may have windows 40 and other viewing panels to allow an operator to view cutting operations within an interior of the saw house. The control 30 may send signals to the access opening locks 34 to lock or unlock the access opening. As will be discussed in greater detail below, the saw house 20 and the blade guard assembly associated with the saw blade may also include other sensors that send signals to the control for providing safety interlock features and other functionality to permit safe operation of the saw house.

The saw house 20 typically includes a framework 22 to support the saw house, and the other equipment (pumps, motors, electronics, electrical panels) needed for operation of the saw arm 26 and the saw blade 24. Within the framework 22, the blade guard assembly 50 may be installed. Preferably, the blade guard assembly 50 is installed on the framework 22 associated with the saw house 20 so that the blade guard assembly 50 does not interfere with the saw blade 24 and saw arm 26 during normal cutting operations. FIG. 3 shows an exemplary location of the blade guard assembly for a single saw blade 24 mounted on a top frame 22 of the saw house 20. For a saw house with multiple circular saw blades on a saw arm, multiple blade guard assemblies may be provided for each saw blade.

Figure 18:
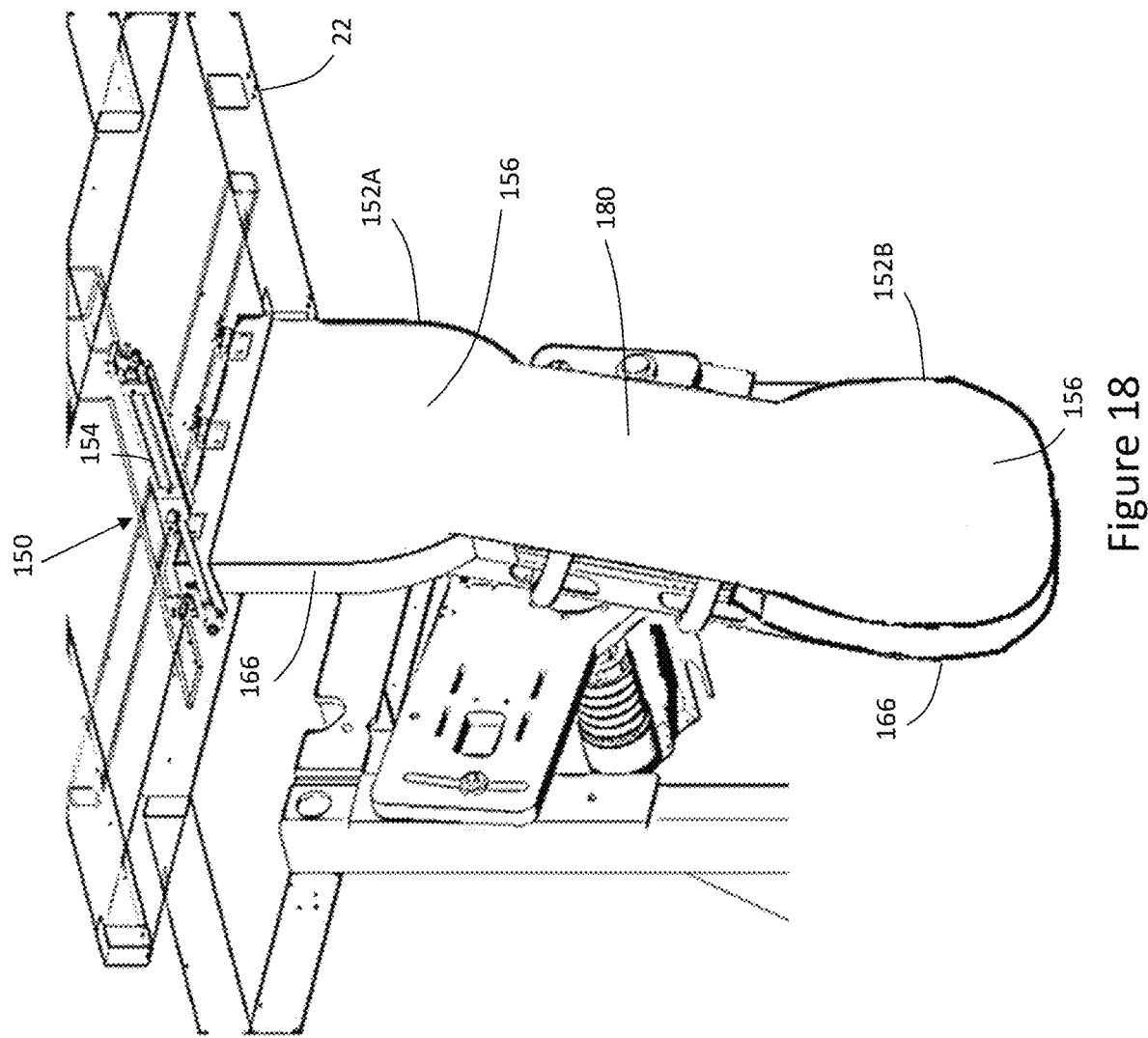
FIG. 18 is a partial perspective view of the saw arm with the two saw blades in the home position with the blade covers for the respective saw blades in a covered position over the respective saw blade.

The blade guard assembly 50 may include one or more blade covers 52 and an actuator 54. For ease of description and illustrating the embodiment shown in FIGS. 3-16, a single blade cover will be described, although the principles of the disclosure may be applied to multiple blade covers for multiple saw blades, for instance, as shown in FIGS. 17 and 18, or multiple blade guard assemblies for multiple saw blades. When installed in the saw house, the actuator 54 may be enabled to position the blade cover 52 between a covered relationship (FIG. 4) with saw blade and an exposed relationship (FIG. 3) with the saw blade 24. Depending upon the desired operation, the actuator 54 may be enabled to position the blade cover 52 over the saw blade 24 when the saw blade is not in use and to position the blade cover away from the saw blade to allow the arm 26 and saw blade to perform normal cutting operations within the interior of the saw house. In the description that follows, the blade guard assembly 50 is configured in a manner such that the blade cover 52 pivots with the actuator 54 between the covered and exposed positions. However, the description is not limited to pivoting motion of the blade cover between the covered and exposed positions and may include other types of motion. By way of example and not in any limiting sense, the blade guard assembly may be configured in a manner such that the blade cover moves linearly between the exposed and covered positions. In one such arrangement, the actuator may move the blade cover with one axis motion between the exposed and covered positions, for instance, vertically or horizontally in the drawings. In another arrangement, the actuator may move the blade cover between the exposed and covered positions with two axis motion or compound motion, for instance, vertically and horizontally, or arcuate motion in the drawings. In such an arrangement, the actuator may include a four bar linkage to move the blade cover upward and away from the saw blade when moving to the exposed position, and downward and toward the saw blade when moving to the covered position. The blade cover may also include a multi-piece assembly that folds to a compact arrangement when moving to the exposed position and unfolds to an extended arrangement when moving to the covered position.

In another example, the blade guard assembly 50 may be configured to receive position information of the saw blade 24 from the control 30 associated with the saw house, for instance, by way of an encoder mounted on the saw arm 26. The actuator 54 of the blade guard assembly may be configured to move the blade cover 52 from the exposed position to the covered position over the saw blade 24 in various positions/orientations of the saw blade within the saw house interior. Additionally, in a saw house with multiple saw blades, a blade cover for each saw blade may be moved from its respective exposed position to the covered position by one or more actuators. In the alternative, in a saw house with multiple saw blades, a blade guard assembly may be provided for each saw blade and a respective blade cover of each blade guard assembly may be moved from its respective exposed position to the covered position by an actuator of the blade guard assembly.

In the non-limiting example shown in FIGS. 3-16, for a single blade saw house configuration where the maintenance or home position for the saw blade corresponds to a position in which the saw blade 24 is generally closest to the interior top frame of the saw house (e.g., a 12 o'clock position), the blade guard assembly may be configured to pivot one blade cover from the top frame between the exposed position and the covered position. In this configuration, the blade cover 52 may comprise a generally flat or planar face panel 56.

The face panel 56 may have a pivot edge 58 with first and second ends 60,62. The face panel 56 may have an area defined by a periphery 64 and sized in accordance with the circular saw blade diameter. The face panel 56 extends toward the saw blade center to provide continued protection as the diameter of the saw blade decreases as the saw blade wears throughout its working life. An edge portion 66 may extend from the face panel 56 at the periphery 64. The periphery 64 may comprise an edge with the edge portion 66 connected to the face panel 56 at the edge, for instance, as shown in the drawings. In the alternative, the face panel 56 and edge portion 66 may have a gradual or curved transition at the periphery. The edge portion 66 may also be spaced inward from the periphery 64 to define the area in accordance with the saw blade diameter. By way of example as shown in the drawings, the periphery may have a portion that extends from the first end 60 of the pivot edge 58, and another portion that extends from the second end 62 of the pivot edge. The edge portion 66 may be provided on at least a portion of the periphery 64 of the face panel 56. For instance, as shown in FIGS. 6-10, the face panel 56 includes a cut out region 68 for accommodating a grinding wheel assembly 70 of the saw house. The grinding wheel assembly cut out 68 may extend through the peripheral edge 64 of the face panel 56. The peripheral edge 64 may be segmented by the grinding wheel assembly cut out 68 with a first portion extending from the first end 60 of the pivot edge 58 and a second portion extending from the second end 62 of the pivot edge. The edge portion 66 may also extend around the grinding wheel assembly cutout 68 to further cover the saw blade when the blade cover 52 is positioned over the saw blade 24 with the cut out 68 aligned with the grinding wheel assembly 70. Depending upon the arrangement of the grinding wheel assembly 70, the edge portion 66 may project from the face panel 56 in the cut out region 68 as needed to accommodate the grinding wheel assembly and cover over the cutting edge of the saw. In the grinding wheel assembly cut out 68, the edge portion 66 and grinding wheel assembly cutout may be sized to allow an operator to perform maintenance on the grinding wheel assembly 70 with the blade cover 52 installed over the saw blade 24. With the blade cover in place over the saw blade, the operator may have safe and convenient access to the grinding wheel assembly cut out 68 to set and/or adjust the interference between the grinders and the saw blade, or to clean the grinders. This in turn eliminates the need for the saw house to be provided with an automated system for grinder setup, adjustment, and/or cleaning, which often relies on sensors that are subject to the forces generated by the cutting motion, and to the harsh environment of tissue dust, grit shed from grinders, and blade lubricants. Along the same lines, the face panel 56 may also have a saw spindle cut-out 72 to allow servicing of a spindle 74 of the saw blade 24 with the blade cover 52 in the covered position over the saw blade. Blade inspection cut-outs 75 may also be provided. The blade cover 52 may be punched, molded, or machined from one or more discrete parts to form the face panel 56, edge portion 66 and/or cut-outs 68,72,75.

The pivot edge 58 of the face panel may include a weldment 76 to provide rigidity for the pivot edge and to provide a mounting location for one or more hinges 78. The hinge 78 may have a first portion which is mechanically connected to the weldment 76 with mechanical fasteners, adhesives and/or brazing or welding. The second portion of the hinge 78 may be configured to attach mechanically to the frame 22 of the saw house. The blade cover 52 may pivot vis-à-vis the hinges 78 about the pivot edge 58 with the pivot edge defining a pivot axis 80 (FIG. 8) for the blade guard assembly 50. While the drawings show three independent hinges provided on the pivot edge to connect to the top frame of the saw house, more or fewer hinges may be used and the hinge may be a continuous hinge, for instance, a piano hinge, or a live hinge.

Figure 14:
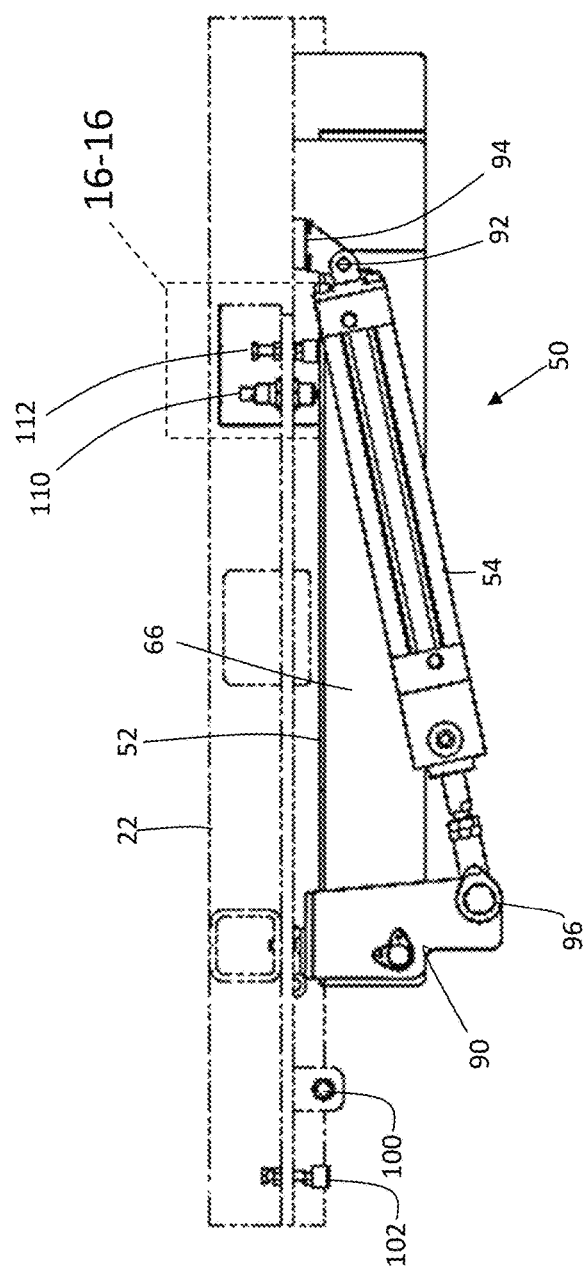
FIG. 14 is a partial, cross-sectional view of the blade guard assembly taken along lines 14-14 of FIG. 12.

In the pivot motion example of the blade guard assembly movement shown in FIGS. 3-16, the blade cover 52 may include a drive shoe 90. The drive shoe 90 may be attached to a first or second end 60,62 of the pivot edge 58 and project from the face panel 56 beyond the edge portion 66. The drive shoe 90 provides a location to attach the actuator 54 to enable the actuator to affect pivoting motion of the blade cover 52 about the pivot edge 58 and pivot axis 80. For instance, as best shown in FIG. 14, the actuator 54 comprises a linear actuator 54 with a swivel 92 attached to a clevis 94 that is mounted to the top frame 22 of the saw house. The actuator 54 opposite end includes a rod end 96 which is operatively connected to the drive shoe 90. The actuator 54 is enabled to position the blade cover 52 between a covered position in which the blade cover is pivoted about the pivot axis 80 such that the face panel 56 is parallel to a plane defined by the saw blade 24 with the edge portion 66 at least partially surrounding the saw blade, and an exposed position where the blade cover is moved away from the saw blade to allow the saw blade and saw arm 26 to perform normal cutting operations. For instance, as shown in the drawings, the actuator 54 is enabled to position the blade cover 52 between a vertical orientation in which the face panel 56 is parallel to a plane defined by the saw blade 24 in the covered position and an horizontal orientation in which the face panel is transverse to the plane defined by the saw blade and is parallel to the top frame 22 of the saw house in the exposed position. The actuator 54 may be a pneumatic or hydraulic actuator, or an electric linear motor (servo-linear actuator; rod-less cylinder). The actuator may also be a torsional actuator or rotary actuator, for instance, a gear driven electric motor or similar actuator depending upon the desired motion for the blade cover in moving between the covered position and the exposed position. The connection of the actuator 54 to the frame 22 of the saw house 20 via the swivel connection 92 and clevis 94 on one end, and the drive shoe 90 on the other end, may be altered as needed depending upon the nature of the actuator used. The drive shoe 90 may also be configured, shaped and dimensioned as needed in order to affect the desired motion of the blade cover 52 over the saw blade 24.

In the example shown in FIGS. 3-16, the blade guard assembly 50 is mounted to the top frame 22 of the saw house 20 and the blade cover 52 is configured to move between an orientation in which the face panel 56 is parallel to the top frame 22 of the saw house in the exposed position and an orientation in which the face panel extends perpendicularly away from the top frame of the saw house so as to be parallel to the plane defined by the saw blade in the covered position. Other orientations of the blade guard may also be utilized depending upon the frame, the motion of the saw arm and the saw blade to perform normal cutting operations, the location of the saw arm and the saw blade when normal cutting operations are stopped or suspended (e.g., the home position or maintenance position of the saw blade). For instance, in a multiple saw blade saw house configuration where the maintenance or home position for one of the saw blades corresponds to a 3 o'clock position and the maintenance or home position for the other saw blade corresponds to a 9 o'clock position, the blade guard assembly for each saw blade may be configured to pivot the respective blade cover from the top frame or side frame between the exposed position and the covered position.

As another example, referring to FIGS. 17 and 18, the blade guard assembly 150 is mounted to the top frame 22 of the saw house 20 and first and second blade covers 152A, 152B are configured to move by way of the actuator 154 between an orientation in which the face panel 156 of each blade cover is parallel to the top frame 22 of the saw house in the exposed position and an orientation in which the face panel extends perpendicularly away from the top frame of the saw house so as to be parallel to the plane defined by the respective saw blade 124A,124B in the covered position. A blade cover spanning member 180 extends between the first and second blade covers 152A,152B and allows the first and second blade covers to move together in a single motion between the exposed position (FIG. 17) and the covered position (FIG. 18). The edge panels 166 of the blade covers 152A,152B may extend along the spanning member 180 and create sufficient depth relative to the face panels 156 to accommodate covering the arm 126, and the grinding wheel assemblies 170 and spindles 174.

Figure 15:
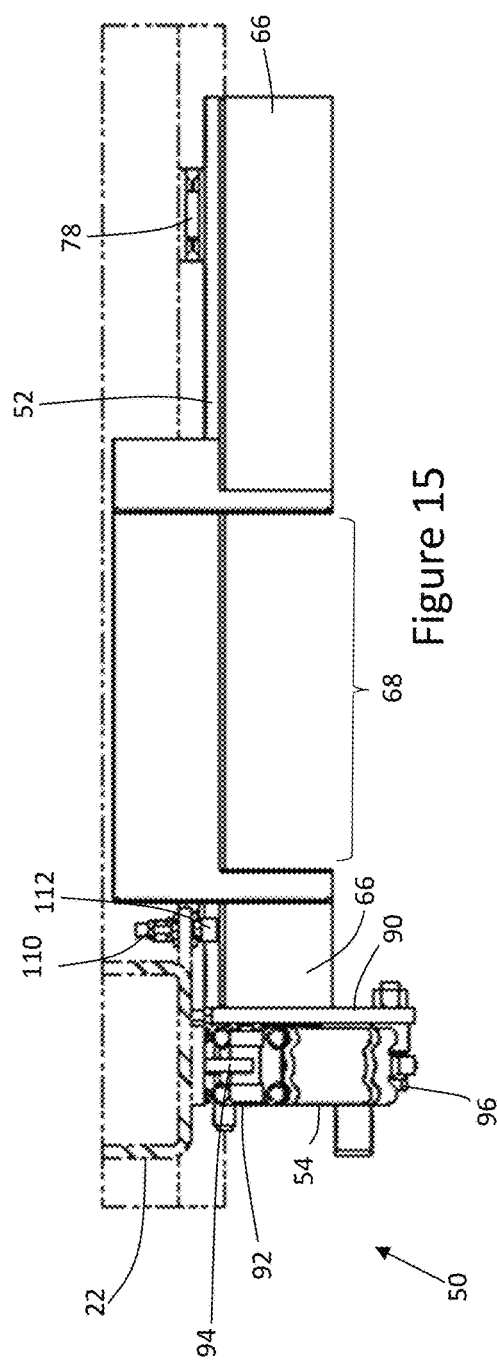
FIG. 15 is a partial, cross-sectional view of the blade guard assembly taken along lines 15-15 of FIG. 12.
Figure 16:
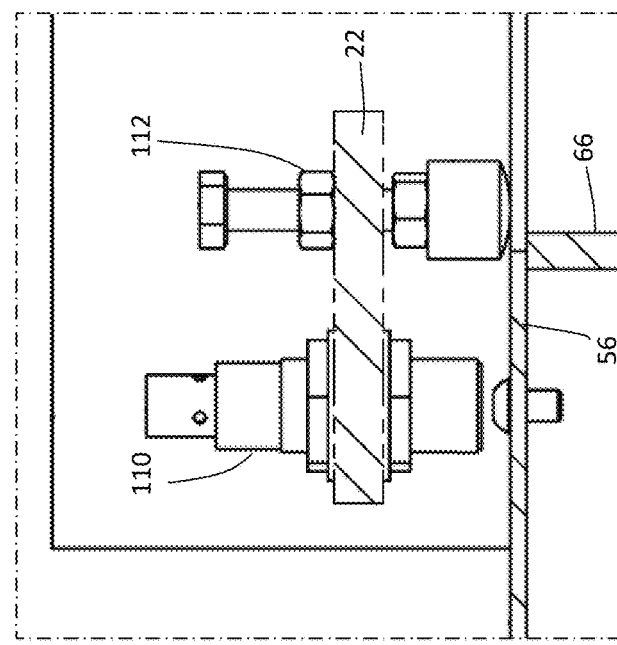
FIG. 16 is an enlarged view of detail area 16-16 of FIG. 12.

As described earlier, the blade guard assembly 50 may be interfaced with the control 30 of the saw house 20 so as to allow the blade cover 52 to be positioned between the covered and exposed positions as needed by operator from the HMI 28 via the actuator 54. To provide additional safeguards, the blade guard assembly 50 may include one or more sensors that are configured to transmit signals to the control 30 indicating whether the blade cover 52 is in the exposed positon or the covered position. As best shown in FIGS. 14, 15 and 16, a safety switch 100 may be provided with the blade guard assembly 50. The safety switch 100 may attach to a top frame 22 of the saw house 20. The safety switch 100 may send signals to the control 30 indicating whether the blade cover 52 is in the exposed and/or covered position. The drive 90 shoe may be shaped and otherwise configured to activate the safety switch 100 as the blade cover 52 is pivoted between the exposed and covered position. For instance, FIG. 14 shows the blade cover 52 in the exposed position. As the blade cover 52 is moved to the covered position via the actuator 54, the drive shoe 90 rotates into position to actuate the safety switch 100, indicating that the blade cover is in the covered position. A bumper 102 may be provided to assist in locating the drive shoe 90 on the safety switch 100 after extension of the actuator 54. During set-up of the blade guard assembly 50, adjustments may be made to the bumper 102 to set the position of the drive shoe 90 relative to the safety switch 100 after the linear actuator drives the drive shoe into position.

Additionally, the blade guard assembly 50 may be provided with a proximity switch 110. The proximity switch 110 may be activated by the blade cover 52 when the blade cover comes adjacent to the proximity switch. For instance, as shown in FIG. 14, the blade cover 52 will activate the proximity switch 110 when the blade cover is in the exposed position. The proximity switch 110 may send a signal to the control indicating that the blade cover 52 is in the exposed or covered position. A bumper 112 may be disposed adjacent to the proximity switch 110 to adjust the relative location of the blade cover 52 in the exposed position so as to correctly activate the proximity switch. The proximity switch 110 and the safety switch 100 may work in tandem to provide redundant indication of whether the blade cover 52 is in the exposed and/or covered position or each may provide a separate signal for the control, for instance, the safety switch indicating the blade cover is in the covered position and the proximity sensor indicating the blade cover is in the exposed position (or vice versa).

In operation, an operator may stop normal cutting operations of the circular saw blade 24 in the saw house 20 by inputting applicable control signals at the HMI 28. The cessation of normal cutting operations may allow the saw blade 24 to move to a known position, for instance, a home or maintenance position, or another accessible position in the saw house 20. The known position may be determined by sensor feedback, for example, an encoder operatively connected to the arm to provide angular position feedback to the control 30, or a proximity switch activated to provide a signal to the control when the arm is in the home or maintenance position. In response to the signal indicating the saw blade 24 is in the known position, the control 30 may generate a signal actuating the actuator 54 to move the blade cover 52 from the exposed position to the covered position. Depending upon the known position, the actuator may be configured to rotate and/or move the blade cover 52 so as to align the grinding wheel assembly cutout 68 with the grinding wheel assembly 70 and/or spindle cut-out 72 with the spindle 74. Additionally, in the event of a failure, for instance, the inability of the saw arm to reach the home position or maintenance position upon cessation of saw operations, the control may be configured to receive the known position information of the saw blade from an encoder or other sensor, and send signals to the actuator 54 accordingly. In response to the saw blade positon signals, the actuator 54 may be configured to rotate and/or move the blade cover 52 as needed to the covered position, for instance, to align the grinding wheel assembly cutout 68 with the grinding wheel assembly 70 and/or spindle cut-out 72 with the spindle 74. By way of example, in the blade guard assembly 50 of FIGS. 3-16, the home position is when the saw blade makes its closest approach to the top frame of the saw house. Thus, the blade guard assembly may employ pivoting motion, and the actuator 54 may actuate and drive the drive shoe 90 in a manner so as to pivot the blade cover 52 about the pivot edge 58 of the face panel 56 and position the blade cover in the covered position. As set forth before, for the exemplary blade guard assembly 50 of the drawings, with the blade cover 52 in the covered position, the face panel 56 is generally parallel to the plane defined by the saw blade 24 with the edge portion 66 of the blade cover surrounding at least a portion of the cutting edge of the saw blade.

When the blade cover 52 is in the covered position, the safety switch 100 and/or proximity switch 110 may be activated providing a signal to the control 30 indicating the blade cover is in the covered position. In response to the signal indicating the blade cover 52 is in the covered position, the control 30 may generate a signal to the lock 34 of the access opening 32 enabling the access opening to be unlocked thereby providing access for the operator to the interior of the saw house 20 and/or adjacent areas. At this time, the operator may enter the saw house and/or adjacent areas to perform any required maintenance on the grinding wheel assembly 70, spindle 74, or the conveyor (not shown) or any other issue not directly involving access to the saw blade 24. Once the operator has completed required maintenance within the interior of the saw house 20, the operator may exit the saw house and close the access openings 32. Once the access openings 32 are closed, the operator may access the HMI 28 and begin a sequence to resume normal cutting operations. Once the access opening 32 has been closed, the sensor 36 of the lock 34 of the access opening may send a signal to the control 30 indicating the access opening is closed. In response to the signal indicating that the access opening 32 is closed, the control 30 may send a signal to the actuator 54 to move the blade cover from the covered position to the exposed position. The control 30 may also send a signal to the lock 34 of the access opening 32 to lock the access opening. When the blade cover reaches the exposed position, the proximity switch 110 and/or safety switch 100 may send a signal to the control indicating the blade cover is in the exposed position. Thereafter, the control 30 may enable the saw house to begin normal cutting operations.

To the extent maintenance in the interior of the saw house 20 requires maintenance directly on the saw blade 24, a manual override may be provided to the control 30 via HMI 28 so as to allow access to the interior of the saw house with the blade guard 52 in the exposed position; provided the maintenance blade carrier (not shown) is accessed and removed from its mount (not shown). The maintenance blade carrier may be provided to allow access to the saw blade for special handling requirements, for instance, for installation, removal, transport, or inspection. Once the saw blade special handling operations are complete, the maintenance blade carrier may be removed from the saw blade 24 and returned to the maintenance blade carrier mount associated with the saw house 20. The maintenance blade carrier mount may have sensors that provide interlock signals such that when the maintenance blade carrier is removed from the maintenance blade carrier mount and the manual override is enabled, the control 30 may be enabled to send signals to the actuator 54 to maintain or move the blade cover 52 to the exposed position to allow engagement of the maintenance blade carrier around the saw blade 24. Once the maintenance blade carrier is returned to the maintenance blade carrier mount (for instance, when maintenance is complete), the sensors associated with the maintenance blade carrier mount may send signals to the control 30 to enable the control to actuate the actuator 54 and move the blade cover 52 from the exposed position to the covered position.

Figure 19:
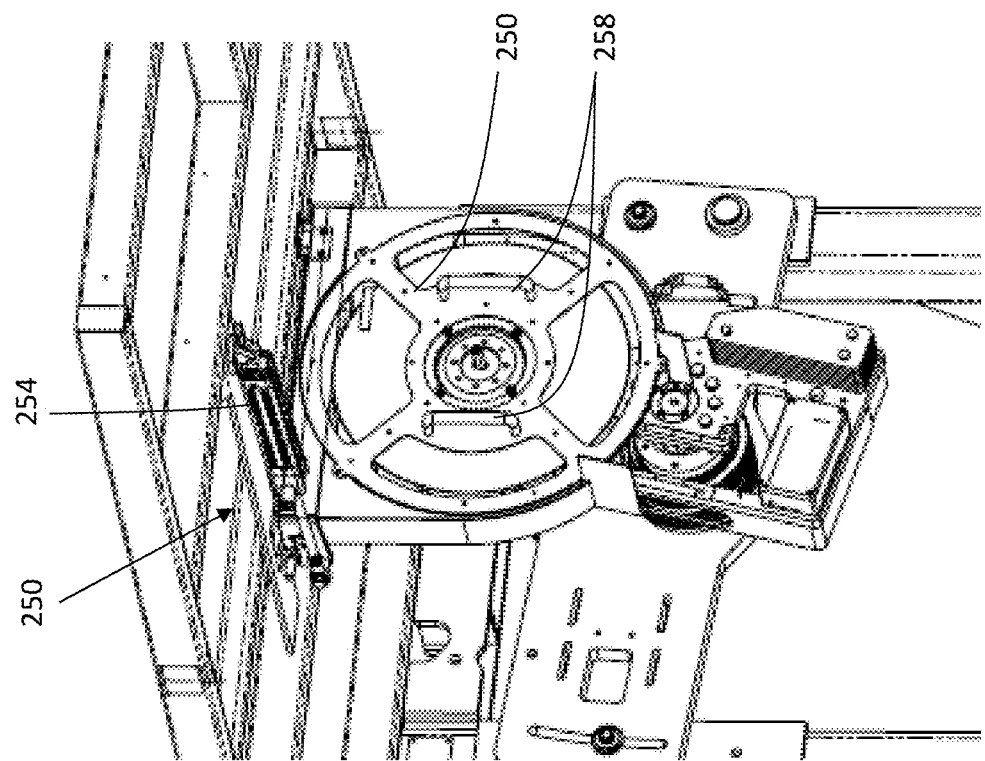
FIGS. 19-20 show embodiments of a blade cover comprising a maintenance blade carrier.
Figure 20:
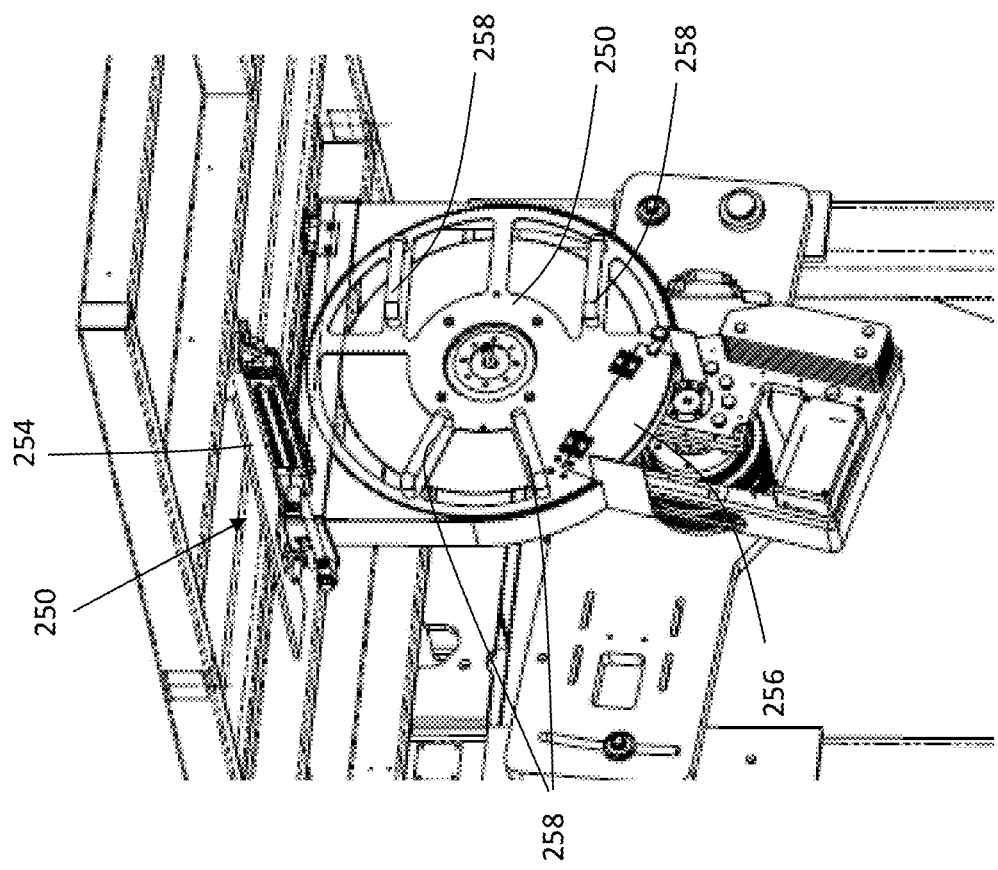

The maintenance blade carrier may be separate from the blade guard assembly or may be integrated with the blade guard assembly. In one example as shown in FIGS. 19-20, the blade cover 250 may be detachably removable from the actuator 254 and any other operative connections with the saw house. Accordingly, when the blade cover 250 is in the exposed position, the blade cover may be removed from the actuator 254 and its operative connections with the saw house, and used as the maintenance blade carrier. Additional cover pieces may be attached to the blade cover to more fully cover any exposed portions of the saw blade when the blade cover is used as the maintenance carrier. For instance, an additional cover piece 256 may be positioned around the grinding wheel assembly cutout to cover the portion of the exposed blade in the grinding wheel assembly cutout when the blade cover is used as the maintenance blade carrier. The additional cover pieces may be selectively deployed from the blade cover to cover exposed portions of the saw blade when used as the maintenance blade carrier and stowed on the blade cover when the blade cover is used in normal operations moving between the covered and exposed positions. For instance, an additional cover piece may be pivoted into position around the grinding wheel assembly cutout to cover the portion of the exposed blade in the grinding wheel assembly cutout and pivoted out of the way during normal operations of the blade cover. The additional cover pieces may also be separate items provided as a kit for servicing of the saw blade. The blade cover may include handles 258. The handles may be fixed in position on the blade cover or may be pivoted out of the way during normal operations of the blade cover and pivoted into position for use when the blade cover is used as the maintenance blade carrier.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A saw comprising:
   a saw house with an interior and an access opening to the interior;
   at least one saw blade within the interior of the saw house;
   an arm within the interior of the saw house, the arm being operatively coupled to the at least one saw bade,
   wherein when the saw is enabled for a cutting operation, the saw is adapted and configured to move the arm in a manner that the at least one saw blade moves orbitally in the interior of the saw house and the saw is adapted and configured to rotate the at least one saw blade, such that the arm orbitally moves the at least one saw blade for cutting an object within the interior of the saw house,
   wherein when the saw is disabled from the cutting operation, the saw is adapted and configured to move the arm in a manner that the at least one saw blade is moved to a known position;
   a blade guard assembly for the at least one saw blade, the blade guard assembly including at least one blade cover and an actuator, the actuator being adapted and configured to move the at least one blade cover, the at least one blade cover having a face panel and an edge portion extending from the face panel, the blade guard assembly being arranged in the saw house in a manner such that the at least one blade cover is movable with the actuator between a covering position and an exposing position,
   wherein when the saw is disabled from the cutting operation and when the at least one saw blade is in the known position, the saw is adapted and configured to actuate the actuator to move the at least one blade cover to the covering position, wherein in the covering the position, the face panel is adjacent to the at least one saw blade and the edge portion is adjacent to at least a portion of a cutting edge of the at least one saw blade,
   wherein when the saw is enabled for the cutting operation, the saw is adapted and configured to actuate the actuator to move the at least one blade cover to the exposing position, wherein in the exposing position, the face panel and the edge portion of the at least one blade cover are spaced from the at least one saw blade to allow the arm to move the at least one saw blade orbitally in the interior of the saw house and to allow cutting with the at least one saw blade.

2. The saw of claim 1 wherein the blade guard assembly is mounted in the saw house in a manner such that the at least one blade cover depends from the saw house when the at least one blade cover is in the covering position.

3. The saw of claim 1 wherein the blade guard assembly includes a drive shoe mounted to the at least one blade cover and a first mount of the actuator is mounted to the drive shoe.

4. The saw of claim 3 wherein when the at least one blade cover is in the covering position, the drive shoe cooperates with a sensor of the saw enabling the sensor to generate a first signal indicating the at least one blade cover is in the covering position.

5. The saw of claim 4 wherein a control of the saw is enabled to receive the first signal indicating that the at least one blade cover is in the covering position, and the control is enabled to generate a second signal to unlock the access opening to the interior of the saw house.

6. The saw of claim 3 wherein when the at least one blade cover is in the exposing position, the drive shoe cooperates with a sensor of the saw house enabling the sensor to generate a signal indicating the at least one blade cover is in the exposing position.

7. The saw of claim 1 wherein when the at least one blade cover is in the covering position, the face panel cooperates with a sensor of the saw enabling the sensor to generate a first signal indicating the at least one blade cover is in the covering position.

8. The saw of claim 7 wherein a control of the saw is enabled to receive the first signal indicating that the at least one blade cover is in the covering position and the control is enabled to generate a second signal to unlock the access opening to the interior of the saw house.

9. The saw of claim 1 wherein when the at least one blade cover is in the exposing position, the face panel cooperates with a sensor of the saw enabling the sensor to generate a signal indicating the at least one blade cover is in the exposing position.

* * * * *